(12) United States Patent
McGuffin et al.

(10) Patent No.: US 7,908,053 B2
(45) Date of Patent: Mar. 15, 2011

(54) APPARATUS AND METHOD FOR TROUBLESHOOTING A COMPUTER SYSTEM

(75) Inventors: Thomas F. McGuffin, Seattle, WA (US); Tom D. Judd, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 833 days.

(21) Appl. No.: 11/772,573

(22) Filed: Jul. 2, 2007

(65) Prior Publication Data
US 2009/0012674 A1      Jan. 8, 2009

(51) Int. Cl.
  *G01M 17/00*   (2006.01)
  *G06F 11/34*   (2006.01)
  *G06F 11/36*   (2006.01)
(52) U.S. Cl. .......................................................... 701/35
(58) Field of Classification Search ...................... 701/35
  See application file for complete search history.

(56) References Cited

U.S. PATENT DOCUMENTS

| | | | |
|---|---|---|---|
| 4,901,307 A | 2/1990 | Gilhousen et al. | |
| 6,047,165 A | 4/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,438,468 B1 | 8/2002 | Muxlow et al. | |
| 6,477,152 B1 | 11/2002 | Hiett | |
| 6,795,408 B1 | 9/2004 | Hiett | |
| 6,816,728 B2 | 11/2004 | Igloi et al. | |
| 6,915,189 B2 | 7/2005 | Igloi et al. | |
| 7,010,651 B2 | 3/2006 | McGuffin | |
| 7,146,305 B2 * | 12/2006 | van der Made | 703/22 |
| 7,657,419 B2 * | 2/2010 | van der Made | 703/22 |
| 2004/0153830 A1 * | 8/2004 | Cebula et al. | 714/38 |
| 2004/0235469 A1 | 11/2004 | Krug | |
| 2005/0143013 A1 | 6/2005 | Jha | |
| 2005/0221814 A1 | 10/2005 | Fagan et al. | |
| 2005/0286452 A1 | 12/2005 | Hardgrave et al. | |
| 2006/0031394 A1 | 2/2006 | Tazuma | |
| 2006/0080451 A1 | 4/2006 | Eckert | |

(Continued)

FOREIGN PATENT DOCUMENTS

JP      403026136      2/1991

(Continued)

OTHER PUBLICATIONS

Jim Austin, Tom Jackson, Martyn Fletcher, Mark Jessop, Peter Cowley, and Peter Lobner. Chapter 12: Distributed Aircraft Engine Diagnostics. Uploaded/written: Dec. 5, 2002. ftp.mcs.anl.gov/pub/People/pieper/grid/All%20Chapters/Austin/austin.doc. Downloaded : Jun. 12, 2010.*

(Continued)

*Primary Examiner* — Mark Hellner
*Assistant Examiner* — Ari M Diacou
(74) *Attorney, Agent, or Firm* — Fogg & Powers LLC

(57) ABSTRACT

An apparatus for troubleshooting a computer system of a vehicle is disclosed. The apparatus includes a controller for controlling an aspect of operation of the vehicle with at least one process. The apparatus also includes a diagnostic system configured to monitor the at least one process and configured to obtain diagnostic data regarding the at least one process. Additionally, the apparatus includes a wireless device coupled to the diagnostic system and configured to connect to an Internet Protocol (IP) based network, and configured to transmit the diagnostic data over the network.

15 Claims, 3 Drawing Sheets

U.S. PATENT DOCUMENTS

| | | | |
|---|---|---|---|
| 2006/0122746 A1* | 6/2006 | Gawlik et al. | 701/29 |
| 2006/0178141 A1 | 8/2006 | McGuffin et al. | |
| 2007/0250297 A1* | 10/2007 | Gill | 703/6 |
| 2009/0070745 A1* | 3/2009 | Everly et al. | 717/128 |
| 2009/0112398 A1* | 4/2009 | Wempen | 701/35 |

FOREIGN PATENT DOCUMENTS

| | | |
|---|---|---|
| JP | 408163178 | 6/1996 |
| JP | 2004104254 | 4/2004 |

OTHER PUBLICATIONS

Feng Luo; Chu Liu; Zechang Sun; , "Intelligent Vehicle Simulation and Debugging Environment Based on Physics Engine," Informatics in Control, Automation and Robotics, 2009. CAR '09. International Asia Conference on , vol., No., pp. 329-333, Feb. 1-2, 2009.doi: 10.1109/CAR.2009.38 URL: http://ieeexplore.ieee.org/stamp/stamp.jsp?tp=&arnumber=4777252&i.*

Software Static Code Analysis Lessons Learnt. Andy German. © Copyright of QinetiQ ltd 2003. Downloaded:Nov. 17, 2010. http://www.cs.virginia.edu/~jck/cs686/papers/andy.german.pdf.*

Eklund et al., "IEEE Standard 802.16: A Technical Overview of the Wirelessman Air Interface for Broadband Wireless Access", IEEE Communications Magazine, Jun. 2002, pp. i-107, Publisher: IEEE.

Hurlburt et al., A Data Communications Concept for a SATS Scenario", 4TH Integrated CNS Technologies Conference and Workshop, Apr. 2004, pp. 1-20.

Ivancic, "Modular, Cost-Effective, Extensible Avionics Architecture for Secure Mobile Communications", 2006 IEEE Aerospace Conference—Mar. 4-11, 2006 Big Sky, Montana, 2006, pp. 1-9, Publisher: IEEE.

Teledyne Technologies Inc., "Wireless Groundlink System (WGL)", www.teledyne-controls.com/productsolution.wirelessgroundlink.groundlink.asp, 2007, pp. 1-2, Publisher: Teledyne Technologies Inc.

Teledyne Technologies Inc., "New Release", www.teledyne-controls.com/newscenter/sco.asp, 2007, pp. 1-2, Publisher: Teledyne Technologies Inc.

* cited by examiner

APPARATUS AND METHOD FOR TROUBLESHOOTING A COMPUTER SYSTEM

BACKGROUND

Hardware and software diagnostic data is extremely valuable information when troubleshooting a computer system. Often times, however, a technician is not present while the problem is occurring and thus, does not have the diagnostic data. In this situation, troubleshooting is accomplished through logical guesswork by relying on question and answer sessions with system users. If possible, a technician will often try to recreate the problem in order to observe the system and obtain diagnostic data. In some situations, however, these methods make troubleshooting difficult, if not impossible.

As an improved way to troubleshoot computers, systems and methods for using removable storage for computer troubleshooting were developed and are disclosed in U.S. Pat. No. 7,010,651 (referred to herein as the '651 patent), assigned to Honeywell, which is hereby incorporated herein by reference. Systems such as those disclosed in the '651 patent, allow for access to, and remote troubleshooting of computer hardware and software. These systems store data for diagnostic purposes as the system is operating. Additionally, the stored data is on a removable device and thus can be analyzed at a location remote to the computer. These systems, however, require physically accessing the computer and removing the memory.

For the reasons stated above, and for other reasons stated below which will become apparent to those skilled in the art upon reading and understanding the present specification, there is a need in the art for easier access to diagnostic data relating to computer hardware and software.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, an apparatus for troubleshooting a computer system of a vehicle is disclosed. The apparatus includes a controller for controlling an aspect of operation of the vehicle with at least one process. The apparatus also includes a diagnostic system configured to monitor the at least one process and configured to obtain diagnostic data regarding the at least one process. Additionally, the apparatus includes a wireless device coupled to the diagnostic system and configured to connect to an Internet Protocol (IP) based network, and configured to transmit the diagnostic data over the network.

BRIEF DESCRIPTION OF THE DRAWINGS

The present invention can be more easily understood, and further advantages and uses thereof are more readily apparent, when considered in view of the detailed description and the following figures in which.

In accordance with common practice, the various described features are not drawn to scale but are drawn to emphasize specific features relevant to the present invention. Like reference characters denote like elements throughout the Figures and text.

DETAILED DESCRIPTION

In the following detailed description, reference is made to the accompanying drawings that form a part hereof, and in which is shown by way of illustration specific illustrative embodiments in which the method and system may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide for an apparatus for troubleshooting a computer system. The apparatus monitors the computer system to obtain diagnostic data. The apparatus includes a wireless device for wireless transmission of the diagnostic data from the apparatus to a remote computer for analyzing.

Figure 1:
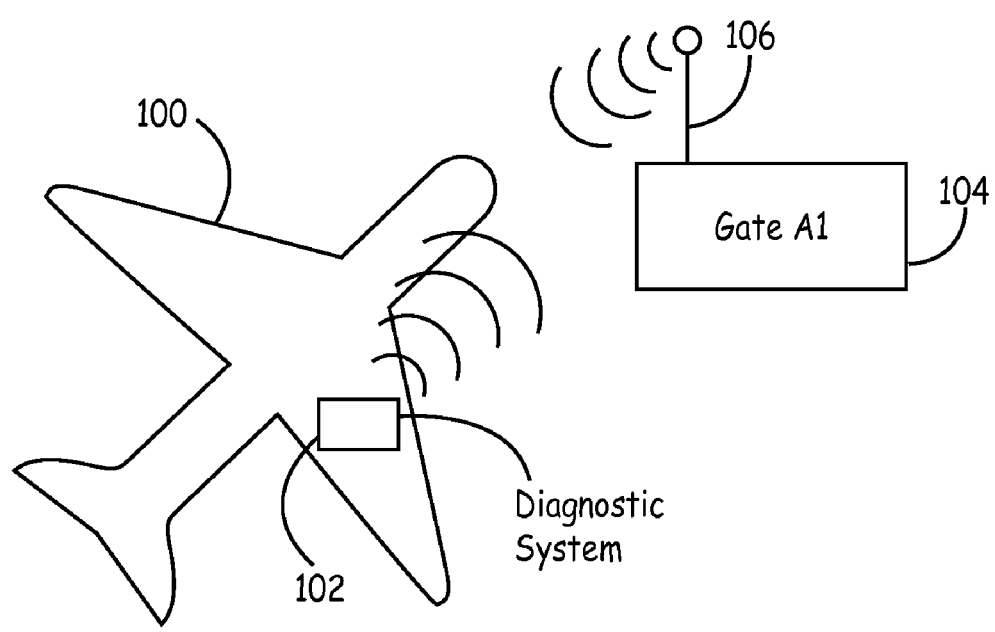
FIG. 1 is a block diagram of one embodiment of system having an apparatus for troubleshooting a computer system.

Referring to FIG. 1, one embodiment of a vehicle 100 having a diagnostic system 102 that accumulates information for diagnostic evaluation of computers within vehicle 100 is illustrated. Diagnostic system 102 accumulates diagnostic data pertaining to the operating parameters, operating history, and status of computers that are used to operate vehicle 100. In one embodiment, diagnostic data is software code obtained when a source code trace is used to debug software for a controller. Software, as used herein, refers to computer software, firmware, or any other code for operating on a processor, microprocessor, or the like. For example, while vehicle 100 is in operation, system 102 is monitoring a controller for controlling the automatic pilot for vehicle 100. Data obtained while monitoring the controller is stored by system 102 for use in troubleshooting any errors that may have occurred while the automatic pilot was in operation. When vehicle 100 is within wireless transmission range of a terminal gate 104, the data obtained is transmitted to an access point 106 on gate 104. The access point 106 is connected to a network such that the data can be transported over the network. Although in FIG. 1 vehicle 100 is illustrated as an aircraft, the present invention is not intended to be so limited and can include other vehicles, such as automobiles, buses, semis, water vessels, trains, and the like.

Figure 2:
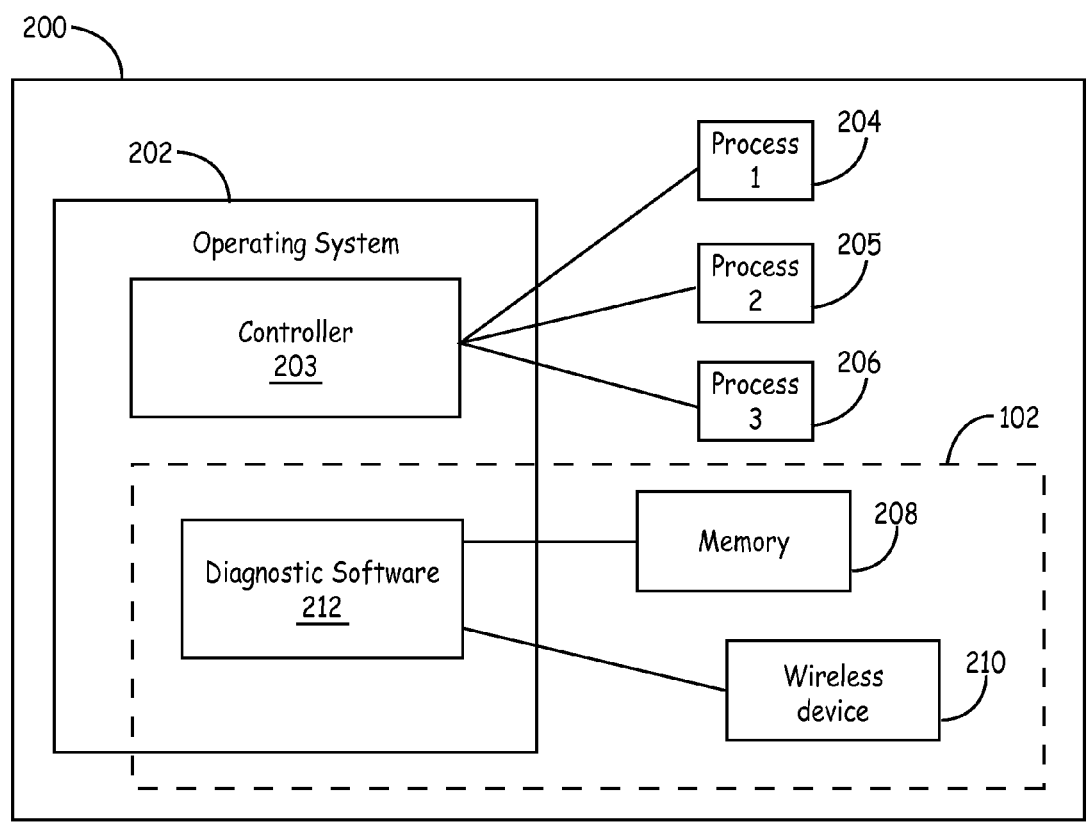
FIG. 2 is a block diagram of one embodiment of the apparatus for troubleshooting a computer system of FIG. 1.

Referring now to FIG. 2, one embodiment of an apparatus 200 including diagnostic system 102 is illustrated. FIG. 2 illustrates a block diagram of functional components that operate within Apparatus 200. Apparatus 200 includes an operating system 202 which includes a controller 203 to control multiple software process (tasks) 204, 205, 206. Processes 204-206 control aspects of the operation of vehicle 100. Apparatus 200 also includes diagnostic system 102. Diagnostic system 102 includes a memory device 208, a wireless communication device 210, and diagnostic software 212. Both controller 203 and diagnostic software 212 are run by operating system 202. Thus, in this embodiment, operating system 202 controls both the processes 204-206 which operate vehicle 100 as well as diagnostic system 102 which monitors processes 204-206. As an example, system 102 may include a memory having stored program instructions which are executable by operating system 202. In an alternative embodiment, diagnostic system 102 is a stand-alone unit and is separate from operating system 202.

As vehicle 100 is operated, processes 204-206 operate controlling their respective aspects of vehicle 100. While processes 204-206 are operating, diagnostic system 102 monitors processes 204-206 and obtains data regarding the operation of those process 204-206. As the data is obtained, diagnostic system 102 stores the data onto memory device 208. The data is stored so that it is available for use later to troubleshoot problems with processes 204-206. For example, in one embodiment, process 204 operates the automatic pilot for vehicle 100. When an operator of vehicle 100 initiates the automatic pilot, operating system 202 starts process 204 and also begins recording data regarding process 204. If the automatic pilot fails during operation, a technician can obtain the data stored regarding process 204 and review the data to diagnose any problems with process 204. In one embodiment, memory device 208 is a removable memory device, which allows a technician to remove the memory and analyze the data. In an alternative embodiment, memory device 208 is an internal permanently mounted memory device.

Since many vehicles are operated without a technician nearby, storing data for the technician to review is important in order to reduce the time and difficulty in troubleshooting the system. In currently available systems, therefore, when a vehicle is brought to an area in which the technician can diagnose the problem, the technician physically access the system in order to diagnose the problem. Further, in many situations the technician must analyze the data in a location that is remote to the location of the vehicle. Thus, the data must be accessed at the vehicle and physically transported to the location where the analyzing will take place. This increases the time required to diagnose the problem. Any time spent diagnosing the problem is downtime in which the vehicle cannot be used. Reducing down time for a vehicle improves productivity and is important, especially if the vehicle is a commercial vehicle.

To reduce the time and difficulty in diagnosing these systems, in diagnostic system 102, the data is wirelessly accessible from diagnostic system 102. Wireless accessibility is provided by wireless communication device 210. In one embodiment, wireless communication device 210 is a PCM-CIA wireless LAN card. Here, wireless communication device 210 is an inexpensive off-the-shelf component, which enables easy installation, replacement, and configuration. In an alternative embodiment, wireless communication device 210 is a permanently mounted wireless device. In a preferred embodiment, wireless device 210 is an IP based device which connects and transmits data over a LAN connection. Advantageously, an IP based device allows diagnostic system 102 to easily connect to existing networks and to easily transmit data to a networked computer for analyzing by the technician. Due to the common occurrence and easy set up of IP based networks, an IP based wireless device reduces the difficulty in implementing wireless access to diagnostic system 102. In one embodiment, wireless device 210 communicates using the 802.11 protocol. In particular, one embodiment of wireless device 210 communicates using the 802.11g protocol. In an alternative embodiment, wireless device 210 connects to a proprietary network using a proprietary protocol. In another alternative embodiment, wireless device 210 is on the same module as memory 208.

Once the data has been obtained, wireless device 210 transmits the data to another wireless device. In one embodiment, the other wireless device is a wireless access point which is connected to a network. In this embodiment, the data is transported through the network to a computer where a technician can analyze the data. In another embodiment, wireless device 210 transmits the data directly to a laptop where a technician can analyze the data.

In one embodiment, the data is transmitted automatically once wireless device 210 comes within range of wireless device for reception of the data. In another embodiment, the data is transmitted only if a significant event has occurred which requires review by the technician. In yet another embodiment, the data is transmitted on command after wireless device 210 is instructed to transmit the data.

In one embodiment, wireless communication occurs in both directions for diagnostic system 102. Here, wireless device 210 transmits to and receives signals from another computer. The signal transmissions from diagnostic system 102 are primarily for data uploading as described above. The signal reception in to diagnostic system 102, however, allows a technician to control diagnostic system 102 remotely. Often to obtain the data regarding the operation of processes 204-206, a technician runs a test procedure on diagnostic system 102 that obtains the data and records the data onto memory device 208. There are multiple options of tests to run based on the process to be analyzed and/or the type of data desired. Thus, having bidirectional communication with diagnostic system 102 enables the technician to run tests and obtain the data at a remote computer without having to be physically present at vehicle 100.

In one embodiment, a technician remotely configures a test to run on apparatus 200 by sending signals from a computer over a network which are received at wireless device 210. For example, when wireless device 210 is within range of access point 106, a technician sends a command from a computer connected via a network to access point 106. The command is destined for wireless device 210 and access point 106 forwards the command to wireless device 210. Wireless device 210 receives the command and sends the command to operating system 212. The command instructs operating system 202 to adjust a setting for controller 203. The technician then remotely initiates a test by sending a command to initiate a certain test from the technician computer over the network to diagnostic software 212. Diagnostic system 102, the initiates that test when the command is received. Data obtained from the test is transmitted by wireless device 210 over the network and to the technician computer.

In conventional systems, when a technician runs a test while at the apparatus being tested, the data retrieved by the test is displayed on screen. Generally, the apparatus being tested is not designed with a screen. Any screen and display protocol attached to the apparatus, therefore, has limited functionality. For example, in many diagnostic systems, the output data is simply displayed on the screen in real-time and once the screen is filled with data, the oldest data is scrolled off the screen to make room for new data. Once the information is scrolled off of the screen, the information is gone.

In one embodiment, therefore, diagnostic data is streamed from diagnostic system 102 to a technician computer. Here, when a technician runs a test, the diagnostic data is obtained and is output to wireless device 208 in real-time, or near real-time. In one embodiment, a block of data (e.g. 100 Kb) is used to buffer intense bursts of data for streaming. Wireless device 210, then streams the diagnostic data over a network and to a technician PC, wherein the data can be stored and analyzed. Then, the technician PC can be configured to display the data or a subset of the data as desired for the particular application. In one embodiment, the technician PC is configured to analyze the data for specific data and take action if the specific data is found. For example, the PC could display the data and surrounding details, or set off a system alarm. In one embodiment, when bidirectional communication is used, while the data is being obtained at the technician PC, the technician can pause the test and scroll through the data forward and backward. After scanning the data, the technician can resume the test.

Figure 3:
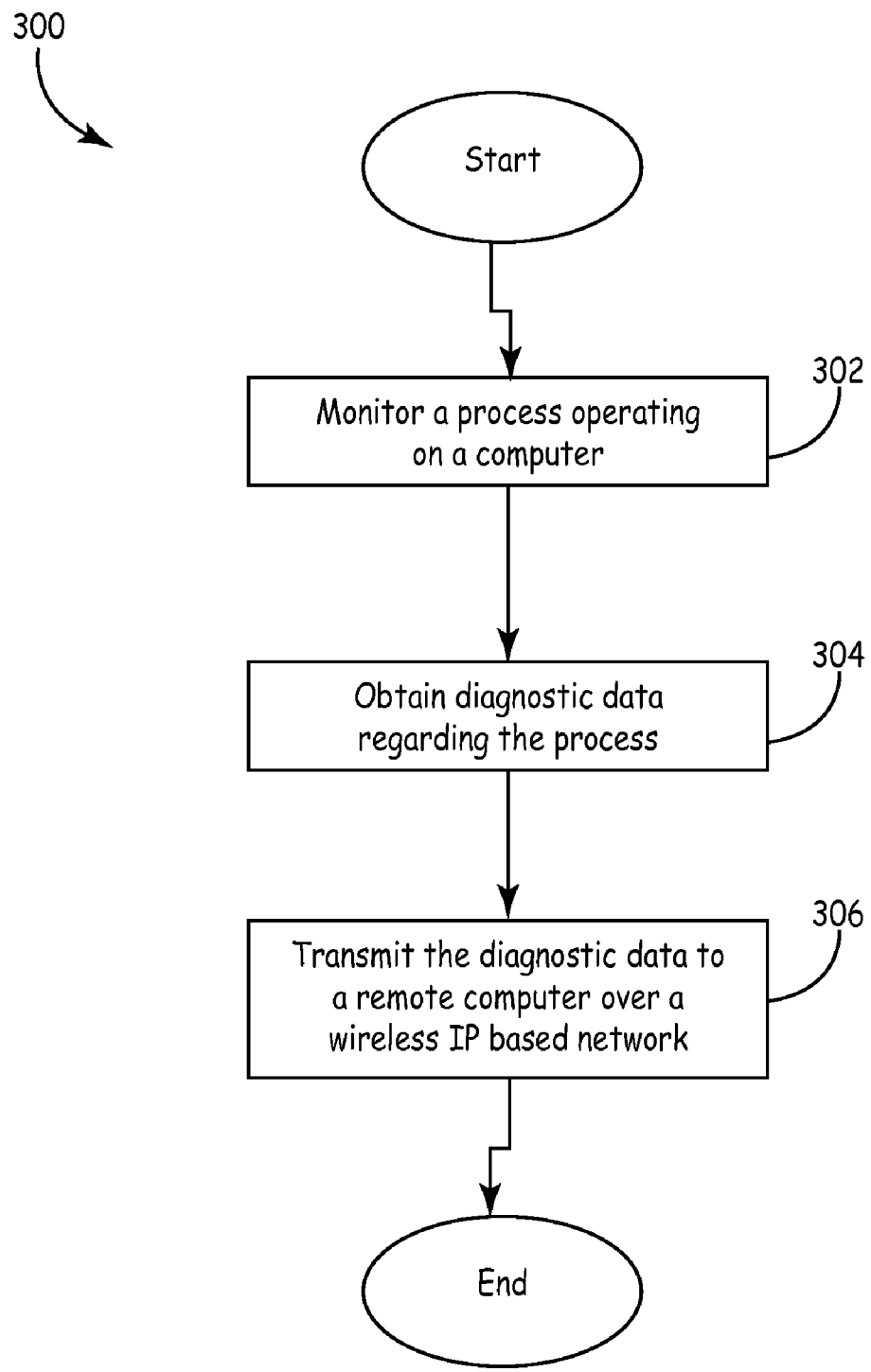
FIG. 3 is a flow chart of one embodiment of a method of troubleshooting a computer system.

FIG. 3 illustrates a flowchart of one embodiment of a method 300 for troubleshooting a computer system of a computer. Method 300 begins by monitoring a process that is operating on a computer (302). Diagnostic data is then obtained regarding the process being monitored (304). Once obtained, the diagnostic data is transmitted to a remote computer over an IP network (306).

To further understand the context of method 300 and diagnostic system 102, here is one example in which vehicle 100 is an aircraft. As the aircraft is flying, operating system 202 monitors and records data from process 204 which is operating on aircraft. The data is stored in memory device 208. When the aircraft lands at an airport, the aircraft taxis to a gate for offloading of passengers and fuel/maintenance check. The gate is equipped with a wireless access point. In one embodiment, when wireless device 210 comes within range of the wireless access point at the gate, diagnostic system 102 automatically uploads the data stored on memory device 208 to a technician computer. In this example, the technician computer is located in a maintenance bay at the airport and is networked to a LAN which the wireless access point is also networked. Thus, when wireless device 210 comes within range of the wireless access point, diagnostic system 102 connects with the technician computer over the LAN and the data is uploaded. In an alternative embodiment, the data is retrieved manually by the technician computer initiating connection with diagnostic system 102 at some point in time when wireless device 210 is within range of the wireless access point.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An apparatus for troubleshooting a computer system of a vehicle, the apparatus comprising:
   a controller, the controller controlling an aspect of operation of the vehicle with at least one software process;
   a diagnostic system configured to monitor the at least one software process and configured to obtain software diagnostic data regarding operation of the at least one software process; and
   a wireless device coupled to the diagnostic system and configured to connect to a network, and configured to transmit the software diagnostic data over the network;
   wherein the software diagnostic data is software code obtained when a source code trace is used to debug the at least one software process.

2. The apparatus of claim 1, wherein the wireless device is configured to connect to an IP based network.

3. The apparatus of claim 1, wherein the controller further comprises a memory device configured to store the data obtained from the monitoring process.

4. The apparatus of claim 3, wherein the memory device and the wireless device are on one module.

5. The apparatus of claim 1, wherein the apparatus is for troubleshooting a computer system of an aircraft.

6. The apparatus of claim 1, wherein the wireless device is configured to receive information over the network.

7. The apparatus of claim 1, wherein the diagnostic system is further configured to run at least one test, the at least one test configured to analyze the at least one software process; and
   wherein the wireless device is configured to receive commands controlling the operation of the at least one test.

8. The apparatus of claim 1, wherein the software diagnostic data is software code obtained from a source code trace.

9. The apparatus of claim 1, wherein the wireless device is configured to transmit data automatically when the wireless device is within range of a device for reception of the software diagnostic data.

10. A method for troubleshooting a computer system of a vehicle, the method comprising:
    monitoring a software process being executed by a controller, the controller controlling an aspect of operation of a vehicle;
    obtaining software diagnostic data regarding the software process; and
    transmitting the software diagnostic data to a remote computer over a network;
    wherein the software diagnostic data is software code obtained when a source code trace is used to debug the software process.

11. The method of claim 10, wherein transmitting further comprises transmitting the software diagnostic data automatically as soon as a wireless transmitter is within range of a wireless device for reception of the software diagnostic data.

12. The method of claim 10, wherein transmitting further comprises transmitting the software diagnostic data over an IP based network.

13. The method of claim 10, wherein the software diagnostic data is software code obtained from a source code trace.

14. The method of claim 10, further comprising:
    receiving at a wireless device a command controlling the operation of a test, the test configured to obtain software diagnostic data regarding the software process.

15. The method of claim 10, further comprising:
    receiving at a wireless device a command for configuring the controller.

* * * * *